United States Patent
Gilpin et al.

(10) Patent No.: US 9,963,837 B1
(45) Date of Patent: May 8, 2018

(54) METHOD FOR OPERATING AN ASPHALT PLANT

(71) Applicant: Industrial Process Systems, Inc., Louisville, KY (US)

(72) Inventors: Gregg A Gilpin, Louisville, KY (US); Leonard A Loesch, Naples, FL (US)

(73) Assignee: Industrial Process Systems, Inc., Louisville, KY (US)

( * ) Notice: Subject to any disclaimer, the term of this patent is extended or adjusted under 35 U.S.C. 154(b) by 299 days.

(21) Appl. No.: 14/822,983

(22) Filed: Aug. 11, 2015

Related U.S. Application Data

(60) Provisional application No. 62/037,803, filed on Aug. 15, 2014.

(51) Int. Cl.
*E01C 19/10* (2006.01)
*B65G 43/00* (2006.01)
*B01F 3/12* (2006.01)
*B01F 15/00* (2006.01)

(52) U.S. Cl.
CPC ........ *E01C 19/1077* (2013.01); *B01F 3/1207* (2013.01); *B01F 15/00136* (2013.01); *B01F 15/00194* (2013.01); *B65G 43/00* (2013.01); *E01C 19/1072* (2013.01); *B01F 2215/0063* (2013.01)

(58) Field of Classification Search
CPC ......... B01F 15/00194; B01F 15/00136; B01F 3/1207; B01F 2215/0063; B01F 15/0229; E01C 19/1077; E01C 19/1072; B65G 43/00; B28C 5/34; B28C 7/0436; B28C 9/002
See application file for complete search history.

(56) References Cited

U.S. PATENT DOCUMENTS

| | | | | |
|---|---|---|---|---|
| 4,042,149 A * | 8/1977 | Main | .................... | G05D 7/0682 222/40 |
| 4,089,509 A * | 5/1978 | Morton | ............... | E01C 19/1072 366/17 |
| 4,218,145 A * | 8/1980 | Brock | ................. | E01C 19/1077 366/18 |
| 4,222,498 A * | 9/1980 | Brock | ................. | E01C 19/1072 222/135 |
| 4,839,571 A * | 6/1989 | Farnham | ............... | G01F 25/003 318/644 |
| 5,270,361 A * | 12/1993 | Duong | .................... | C08L 17/00 428/489 |
| 5,556,197 A * | 9/1996 | Loesch | .................... | E01C 19/10 366/22 |
| 5,686,653 A * | 11/1997 | Homer, III | ........... | G01G 11/006 177/50 |
| 5,904,760 A * | 5/1999 | Hayner | .................... | C08L 95/00 106/279 |
| 6,186,654 B1 * | 2/2001 | Gunteret, Jr. | ........... | B01F 5/265 366/18 |
| 2002/0191481 A1 * | 12/2002 | Cox | ..................... | G11C 7/1078 365/233.1 |

(Continued)

Primary Examiner — Tony G Soohoo
(74) Attorney, Agent, or Firm — Duncan Galloway Egan Greenwald PLLC; Theresa Camoriano; Guillermo Camoriano

(57) ABSTRACT

A method for operating an asphalt plant includes using sensors to quickly pinpoint a problem area and to determine the best course of action to maintain quality production with minimum wasted material and minimum plant downtime.

9 Claims, 4 Drawing Sheets

(56) References Cited

U.S. PATENT DOCUMENTS

2008/0273415 A1* 11/2008 Thornton ............... B28C 5/468
366/3
2015/0353293 A1* 12/2015 Richard ............... G05B 19/402
700/112

* cited by examiner

METHOD FOR OPERATING AN ASPHALT PLANT

This application claims priority from U.S. Provisional Application Ser. 62/037,803 filed Aug. 15, 2014, which is incorporated herein by reference.

BACKGROUND

The present invention relates to a method for operating an asphalt plant. More specifically, it relates to an integrated control system that permits the operator to make consistently high quality asphalt with the minimum amount of wasted material and plant downtime.

There is an increasing demand for higher quality asphalt that meets more stringent performance and composition standards and that is produced in a more eco-friendly manner. It has been reported that some asphalt producers may waste up to 20 tons of product every time they start up before they reach a steady state production of consistent quality product.

The problem can be more serious if the manufacturing process goes off-spec during a production run, resulting in the production of a large amount of asphalt which does not meet the required specification. This product may be rejected by the end user or, if accepted despite not meeting the standard, it may incur a price penalty for having fallen short of the specification. If the product is rejected by the intended user, it may have to be sold at a steeply discounted price to a third party user or totally discarded as waste.

Another problem is incurred if the plant must be shut down due to a component failure or process failure. This is typically referred to as a hot stop. If the issue can be resolved quickly, the plant may attempt a hot start in which all motors and systems are started in unison so as to maintain the proper, pre-stop setting of raw material ratios in an effort to minimize the amount of off-spec asphalt produced. On some asphalt plants, this simultaneous startup of all motors, drives, and systems can put an unbearable starting load on the plant's power system, potentially causing a new shutdown even before the plant is back up on line. If it takes too much time to resolve any issue, the plant will have to proceed with a cold start-up with all the inherent time and material waste of such a start-up.

Naturally, it is desirable to minimize the amount and duration of down time to correct any issues. Preferably the issue can be identified immediately, with the decision to shut down the facility being taken only when it has been established that the issue is real (that is, it is not a false alarm).

An asphalt plant may produce several different grades of asphalt depending on the customer or the application. Change-over to a different grade or formulation has also been a source of much wasted product. Typically, once the run for one formulation has been completed, the flow to the finished product silo is shut off, the ratios of raw material inputs are changed one-at-a-time by the operator according to the new formulation, and the plant is run until steady state is achieved and the plant is once again producing on-spec asphalt. Samples of the asphalt exiting the plant are taken to a laboratory to test its characteristics and composition. If the tests come back showing that the asphalt being produced is not within the specifications, then all that asphalt is out of spec and cannot be sold to the customer within the terms of the contract. This may involve tons of wasted product.

Finally, many plants have cut back on personnel, having only two people on site to run the plant—one person operating the front-end loader and a second person operating the plant. It is very difficult for the people running the plant to do their assigned tasks while at the same time maintaining the plant and ensuring that everything is adjusted correctly and that they are making a quality asphalt mix.

SUMMARY

The present invention provides a method for operating an asphalt plant to ensure production of a quality mix while minimizing shutdowns and wasted product. It also provides a method for operating an asphalt plant with variable speed motors so that items such as drag slat conveyors, exhaust and emissions fans, burners, and other items can be operated at slightly above the production demand needed by the plant, to minimize wear and energy usage. This may be anywhere from 20% to 60% less than full production speed.

One preferred embodiment provides a control system which double-checks critical operating parameters to allow for pinpoint and real-time identification of problem areas, assists the operator in determining whether a shutdown is necessary, allows for sequential start-up of motors and drives during any start-up (hot start or cold start) to prevent overloading the plant's electrical system while maintaining asphalt quality, and allows for on-the-fly changeover to a new formulation with practically no wasted product. This control system can be retrofitted onto existing asphalt plants with relatively minor expense.

DESCRIPTION

Figure 1:
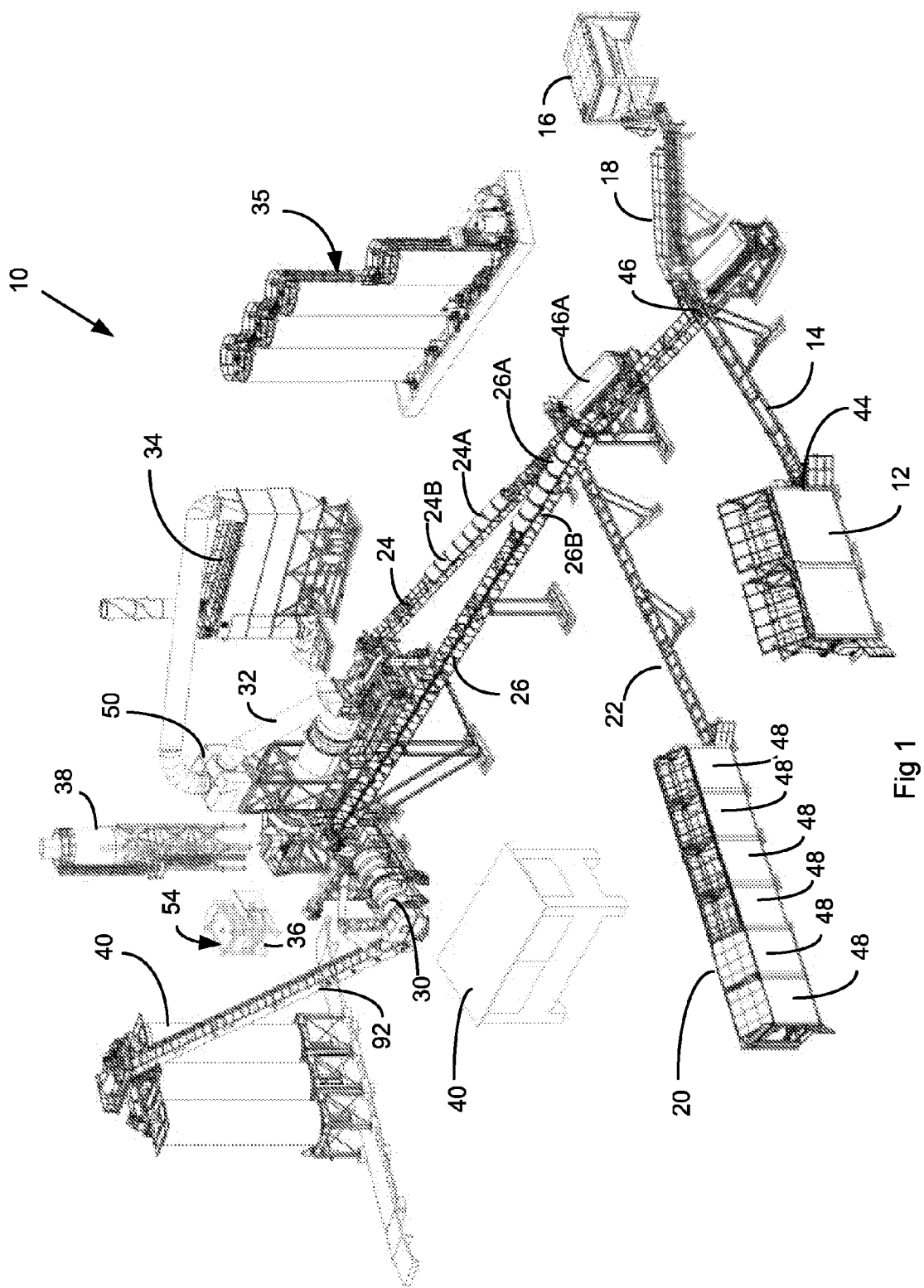
FIG. 1 is a perspective view of an asphalt plant incorporating the method of the present invention.

FIG. 1 shows an asphalt plant 10. The asphalt plant 10 includes a reclaimed asphalt pavement (RAP) bin and feed conveyor 12 with its corresponding RAP transfer conveyor 14; a recycled asphalt shingles (RAS) bin and auger 16 with its corresponding RAS transfer conveyor 18; a screen deck 46 for screening the RAP and RAS; a sorted aggregate bin 20 with its corresponding aggregate collecting conveyor 22; a screen deck 46A for screening the aggregate; a rotary dryer scale conveyor 24; a rotary mixer scale conveyor 26; a rotary dryer 28; a rotary mixer 30; a steam and dust fines removal ductwork 32; a primary separator 50 for initial separation of dust particles; a baghouse 34; an asphaltic cement and other liquid additives tank farm 35; a continuous, in-line shear mixer 36 for mixing the asphaltic cement and other liquid additives; a dry ingredients silo 38; a "drag slat" or elevator conveyor 92; a finished product silo farm 40; and a control room 42 including a computer or central controller (not shown) to monitor and control the instrumentation and controls in the plant 10, as described below.

The sorted aggregate bin 20 includes separate bins 48, each holding a different size of aggregate. Beneath each of the separate bins 48 is a separate variable speed feed conveyor (not shown), which feeds the aggregate from that bin 48 onto the aggregate collecting conveyor 22. Each of the feed conveyors has a conveyor belt and a drive chain that drives the belt. A variable speed drive motor drives each conveyor drive chain at the head end of the corresponding conveyor.

It should also be noted that preferably all bin feed conveyors use a variable speed drive motor and have an RPM sensor located on the "tail end" shaft of the corresponding conveyor to monitor the rotation of the shaft and the speed of the conveyor. The RPM sensors provide signals to the central controller in the control room 42, and those signals are used by the central controller to monitor the operation of the plant in order to control the plant, including controlling the corresponding variable speed drive motors.

The basic overall operation of the plant is that the aggregate is fed from the sorted aggregate bin 20 to the rotary dryer 28 by means of the aggregate collecting conveyor 22 and the rotary dryer conveyor 24. The dried aggregate then is fed from the rotary dryer 28 to the rotary mixer 30, where it is mixed with recycled asphalt pavement (RAP), which comes from the RAP bin (having two variable speed feed conveyors) 12 via conveyors 14 and 26, with recycled asphalt shingles (RAS), which come from the RAS bin (having a variable speed auger) 16 via conveyors 18 and 26, with liquid asphalt, which comes from the liquid asphalt farm 35 via the shear mixer 36, and with dry ingredients from the dry ingredients feeder 38 which includes recycled baghouse fines. The resulting product is conveyed to the silos 40 by means of the conveyor 92. The speeds of the various conveyors and feeds are carefully monitored and controlled by the central controller to ensure that the proper ratios of materials are maintained. For example, if more RAS is used, then less liquid asphalt is fed to the rotary mixer 30, because RAS contains a substantial amount of liquid asphalt. The central controller can control these ratios by controlling the speeds of the drive motors on the corresponding conveyors and by controlling the speed of the pump that pumps the liquid asphalt.

The Recycled Asphalt Pavement (RAP)

Recycled Asphalt Pavement (RAP) is a solid, which contains approximately 5% liquid asphalt. The RAP in the RAP bin (with variable speed feed conveyors having variable speed motors) 12 drops onto the RAP transfer conveyor 14. It should be noted that, in this embodiment, feeders handling solids (such as the RAP, the RAS, and the aggregates), and granules or fines feeders (such as the conveyor from the dry ingredients filler silo 38 and the recycled baghouse fines feeder (not shown)) all preferably have automatic firing of vibrators or air cannons to correct a no-flow condition.

It should also be noted that preferably all bin feed conveyors use a variable speed drive and have an RPM sensor on the tail shaft (such as the tail shaft on the feed conveyor of the RAP bin 12) to monitor the speed of rotation of the shaft. Each RPM sensor provides a signal to the central controller in the control room 42, which is used by the central controller to monitor the operation of the plant and to control the corresponding variable speed drive motors.

As part of its monitoring function, the controller compares the speed signal sent to the drive motor controller with the RPM reading on the respective tail shaft for the conveyor being driven by that particular drive motor. Any difference in these readings relative to the desired setpoint as well as relative to each other (or any difference outside of a previously established acceptable range) is flagged to the operator and may result in an automatic shutdown of the plant 10 depending on the severity of the issue and the inability of the control system to automatically correct for the anomaly. For instance, if the speed signal being sent to the drive motor of the feed conveyor of (RAP) bin 12 indicates normal operation at the setpoint but the corresponding tail shaft indicates a no-RPM condition, the problem is either a failure of the tail shaft RPM monitor (to be checked visually by the operator by determining if the RAP feed conveyor is still operating) or a failure of the variable speed drive system, which would indicate that the motor is not transmitting a driving force to the RAP feed conveyor.

If the problem is the former, the operation of the plant 10 and the quality of the asphalt are not affected and the plant 10 can continue to operate without a shutdown until a scheduled maintenance/replacement of the RPM monitor on the tail shaft of the RAP bin can be completed. If the problem is the latter, the operator may decide to shut down the plant 10, or he may choose to allow the controller to modify the operating parameters of the plant 10 on-the-fly, as discussed later, to compensate for the loss of RAP going into the mix without affecting the quality of the asphalt being produced. In this instance, the operator may decide to continue operation without any RAP, making up the difference by adding more RAS, for example, as well as by increasing the amount of aggregate added to the mix to ensure consistent high quality product.

The Recycled Asphalt Shingles (RAS)

The recycled asphalt shingles (RAS) are also a solid, like the RAP, having approximately 18% to 40% liquid asphalt content. As explained with respect to the other conveyors in this embodiment, the auger on the RAS bin 16 has a tail shaft RPM monitor. The RPM reading is monitored and compared by the controller relative to the desired setpoint. Any discrepancy beyond the acceptable range is flagged to the operator who can then make a decision on whether to shut down the plant 10 or continue operation with adjustments made by the controller, if necessary, to maintain on-spec production.

The Rotary Mixer Scale Conveyor 26

The RAP transfer conveyor 14 and the RAS transfer conveyor 18 both transport their products to the motorized, driven screen deck 46, where the products are screened, and fall through onto the rotary mixer scale conveyor 26. The rotary mixer scale conveyor 26 includes two spaced-apart, in-line, belt scales 26A, 26B to monitor the weight of the material being transported to the rotary mixer 30. The controller monitors these two belt scales 26A, 26B and compares the readings relative to the desired setpoint as well as relative to each other. Any discrepancy between these readings (or any difference outside of a previously established acceptable range) is flagged to the operator and may result in an automatic shutdown of the plant 10 depending on the severity of the issue and the inability of the control system to automatically correct for the anomaly. For instance, if one of the belt scales appears to be working correctly and the second belt scale is not reading at all, it may be reasonable to assume that the second belt scale has failed.

In the above example, the operation of the plant 10 and the quality of the asphalt being produced are not affected and the plant 10 can continue to operate without a shutdown until a scheduled maintenance/replacement of the failed belt scale is completed. If the problem cannot be pinpointed (e.g. both belt scales appear to be working but the readings differ by more than an acceptable range), the operator may decide to shut down the plant 10 until the issue is resolved.

The Sorted Aggregate Bin 20

The sorted aggregate bin 20 includes a plurality of bins 48 with each bin 48 preferably containing different size aggregate to be added to the mix. Each bin 48 has its own bin feed conveyor (not shown) to transfer aggregate from the corresponding bin 48 to the aggregate collecting conveyor 22. Each of these bin feed conveyors has a variable speed drive with a tail shaft RPM monitor, as indicated above for all conveyors with variable speed drives.

The Aggregate Collecting Conveyor 22

The aggregate collecting conveyor 22 delivers aggregate from the sorted aggregate bin 20 to the motorized, driven aggregate screen deck 46A, where the products are screened and then fall through onto the rotary dryer scale conveyor 24.

The Rotary Dryer Scale Conveyor 24

The aggregate collecting conveyor 22 transports aggregate from the sorted aggregate bin 20, through the aggregate screen 46A, onto the rotary dryer scale conveyor 24. The rotary dryer scale conveyor 24 includes two spaced-apart, in-line, belt scales 24A, 24B to check the weight of the material being transported to the rotary dryer 28. As was the case for the rotary mixer scale conveyor 26, the controller monitors the two belt scales 24A, 24B and compares the readings relative to the desired setpoint as well as relative to each other. Any discrepancy between these readings (or any difference outside of a previously established acceptable range) is flagged to the operator and may result in an automatic shutdown of the plant 10 depending on the severity of the issue and the inability of the control system to automatically correct for the anomaly.

The Rotary Dryer 28

The rotary dryer 28 receives aggregate from the aggregate scale conveyor 24. As the aggregate is heated in the rotary dryer 28, a large portion of the moisture is driven off. This moisture, in the form of steam, and any airborne dust particles released from the aggregate, are drawn out by a fan through the steam ductwork 32, through a primary collector 50, and on to a baghouse 34 where the dust particles are filtered out and the steam is released to the atmosphere. Dust particles recovered from the primary collector 50 or from the baghouse 34 are recycled as baghouse fines into the dry ingredients feeder 38 and are fed by an auger into the rotary mixer 30. The auger has a zero speed switch, which triggers an alarm if the auger is not rotating. As the hot and dry aggregate exits the rotary dryer 28, it enters the rotary mixer 30.

The Rotary Mixer 30

The rotary mixer 30 receives the hot, dry aggregate exiting the rotary dryer 28 and mixes this aggregate with other dry ingredients, such as recycled baghouse fines and hydrated lime or other ingredients added via the dry ingredients feeder 38; and with other liquid ingredients, such as liquid asphalt, water, and other liquid additives, as described in more detail below. The RAS and the RAP also are added into the mix at the rotary mixer 30. In this embodiment, the liquid ingredients pass through the in-line shear mixer system 36 on their way to the rotary mixer 30, as described later. Finished asphalt product exits the rotary mixer 30 and is sent to the silo system 40.

The In-Line Shear Mixer 36

To make asphalt, a liquid asphalt is prepared and then is mixed with hot aggregate from the rotary dryer 28 and with the RAS and the RAP, if applicable, in the rotary mixer 30.

Depending on how it will be used or on how it is blended, the liquid asphalt may be categorized as:

1—Hot mix: Mostly asphalt cement, with some other optional ingredients, for instance Styrene Butadiene Styrene (SBS) and/or latex to give it a more rubberized property. It is typically blended at temperatures above 300 degrees F.

2—Dynamically foamed warm mix: If water is added to hot mix, the result is warm mix. This is typically blended at 270 degrees F. The water boils and foams at these high temperatures, and the foamed product enhances the coating of the aggregate with the liquid asphaltic product. Warm mix is prepared at a cooler temperature than hot mix, which makes it easier to handle, more environmentally friendly, and less prone to generating fumes. Warm mix also can be made with other liquid chemical additives that facilitate lower-end-use temperatures.

Studies by the Asphalt Institute have shown that, for every 25 degree F. temperature rise in the asphalt mix, there is an exponential increase in the aging of the liquid asphalt. It is precisely this undesirable aging in the liquid asphalt that warm mix asphaltic product aims to avoid. As a by-product of this process, the warm mix product is also more environmentally friendly and less energy intensive than hot mix product.

3—Cold mix: If fuel oil (such as diesel fuel) and "cutback" (cutback is a term also variously referred to as "snake oil" or M-100) is added to hot mix, the result is cold mix, typically used in pothole repairs.

The present embodiment provides in-line blending of asphaltic product using an in-line shear mixer 36 that allows all the additives to be added into the asphaltic product as it is being blended in-line for prompt mixture with the aggregate in the rotary mixer 30. This eliminates the need to store various types of asphaltic products, as the various "recipes" can be mixed on-the-fly, as they are needed for prompt mixture with the aggregate, and it avoids the waste of mixed products, since only the amount that is needed is prepared just prior to being mixed with the aggregate.

In an embodiment of the present invention, the asphalt plant 10 need only purchase a single, standard grade of liquid asphalt from the asphalt terminal. Once an order comes in for a particular grade/formulation of asphalt, this single, standard grade of liquid asphalt is pumped to the in-line asphalt cement blending system 54 where the desired additives are injected and mixed to produce the desired grade of liquid asphalt.

A major advantage of this in-line asphalt cement blending arrangement 54 is that it reduces the number of storage tanks required to store a large number of different asphalt cement formulations. Storage tanks for the raw materials are all that is needed. The desired end formulation is mixed in-line and is provided in the exact quantity required and at the exact time it is needed. The use of a mechanically driven shear mixer 36 permits the mixing of warm mix asphaltic product at temperatures down to 230 degrees F., which saves energy and reduces the deterioration of product that occurs at higher temperatures.

The mixed material specifications and requirements of each governmental unit for public paving projects can vary greatly. As an example, one state may require chemical additives and blending to meet a certain asphaltic mix requirement. Other states that are served by the same asphalt production facility may find that warm mix (foam) with water is acceptable and preferred. By using an in-line blending system 54, the producer of the mix can select a wide range of options for its customers, resulting in environmentally friendly products of high quality with reduced energy requirements.

Figure 2:
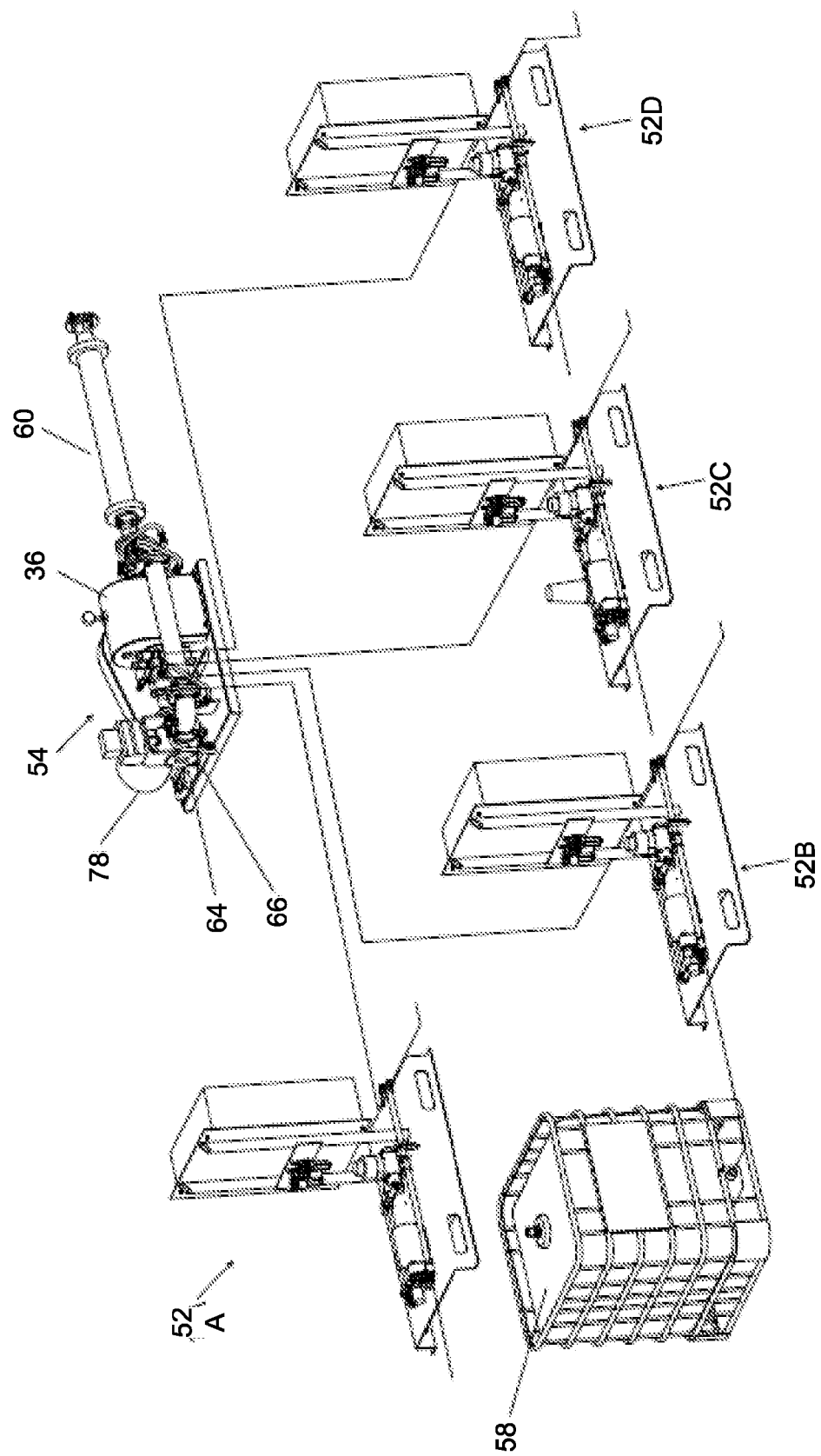
FIG. 2 is a perspective view of an in-line shear mixer process system which is used in the example of an asphalt plant shown in FIG. 1.

FIG. 2 is a perspective view of the in-line asphalt cement blending system 54 of FIG. 1, for in-line blending of asphaltic product. The arrangement includes a plurality of metering pump skids 52A-D (which, in the schematic of FIG. 1 are actually located in the liquid additives tank farm 35), a blending mill skid 54, and a plurality of liquid storage tanks 58 (one of which is shown, with the understanding that there is a tank 58 for each of the metering pump skids 52A-D, and these tanks preferably are also located in the liquid additives tank farm 35).

As described in more detail below, the overall process includes the feeding of liquid asphaltic cement to the in-line shear mixer 36 on the blending mill skid 54. One or more additional liquid ingredients, such as cutback additive, water, latex, liquid chemicals and diesel fuel, may be metered to the asphalt cement flow just upstream of the in-line shear mixer 36, where mechanical energy is used to physically mix the liquid asphalt cement with the other liquid ingredients via shearing of the flow to produce an emulsified, blended product. This blended product is then forced through a static blender 60 as it leaves the shear mixer 36, and the blended product is continuously fed to the rotary mixer 30 and mixed with the heated aggregate and other dry ingredients.

Figure 3:
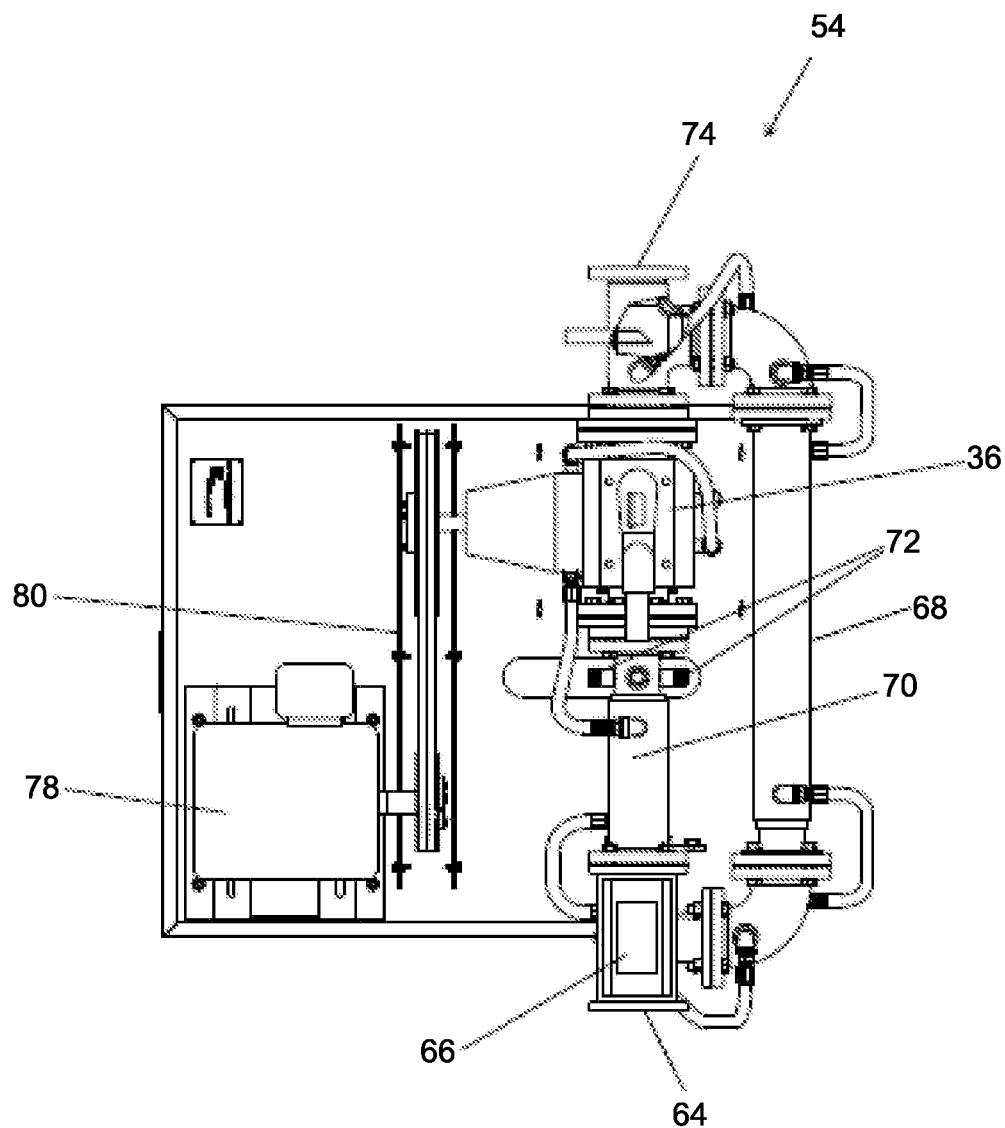
FIG. 3 is a plan view of the in-line shear mixer station of FIG. 2.

Referring to FIG. 3, the in-line asphalt cement blending arrangement 54 has a liquid asphalt cement inlet connection 64 and a 3-way, air operated, plug valve 66, which may be used to allow the flow of asphalt cement to bypass the shear mixer 36 via the hot oil jacketed bypass pipe 68 in the event that no ingredients need to be added to the asphalt cement, as is the case for certain hot mix products. If other liquid ingredients are to be blended into the asphalt cement, the plug valve 66 directs the flow of asphalt cement through the hot oil jacketed feed pipe 70 and into the shear mixer 36.

Just upstream of the shear mixer 36, several injection ports 72 are located along the circumference of the feed pipe 70. Each injection port 72 includes a check valve (not shown) to ensure that flow is only into the feed pipe 70. The injection ports 72 may be used to inject one or more of the ingredients to be blended in with the asphalt cement in the shear mixer 36. Finally, the blended asphalt cement flow exits the in-line shear mixer skid 54 at the outlet connection 74. As shown in FIG. 2, the blended asphalt cement may then flow through a static mixer 60, if desired, and then be pumped on to a storage tank (not shown) or, preferably, directly to the rotary mixer 30 where it is mixed with the aggregate and other materials in the rotary mixer 30.

The shear mixer 36 uses the mechanical energy provided by the electric motor 78, via the belt drive 80, to drive a rotor, which may include vanes, pins, blades, or other mechanical devices that shear and blend the ingredients to produce a uniform, homogeneous emulsion of asphaltic product. The piping, shear mixer 36, and valve 66 preferably are hot-oil jacketed or are otherwise heat traced.

Referring to FIG. 2, there are several metering pump skids 52A-D. These particular metering pump skids are used for metering cutback additive (52A), water (52B), latex (52C), and diesel (52D). More or fewer metering pump skids may be used as desired. For instance, it may be desirable to add another metering pump skid for the addition of polystyrene butadiene styrene (SBS).

Figure 4:
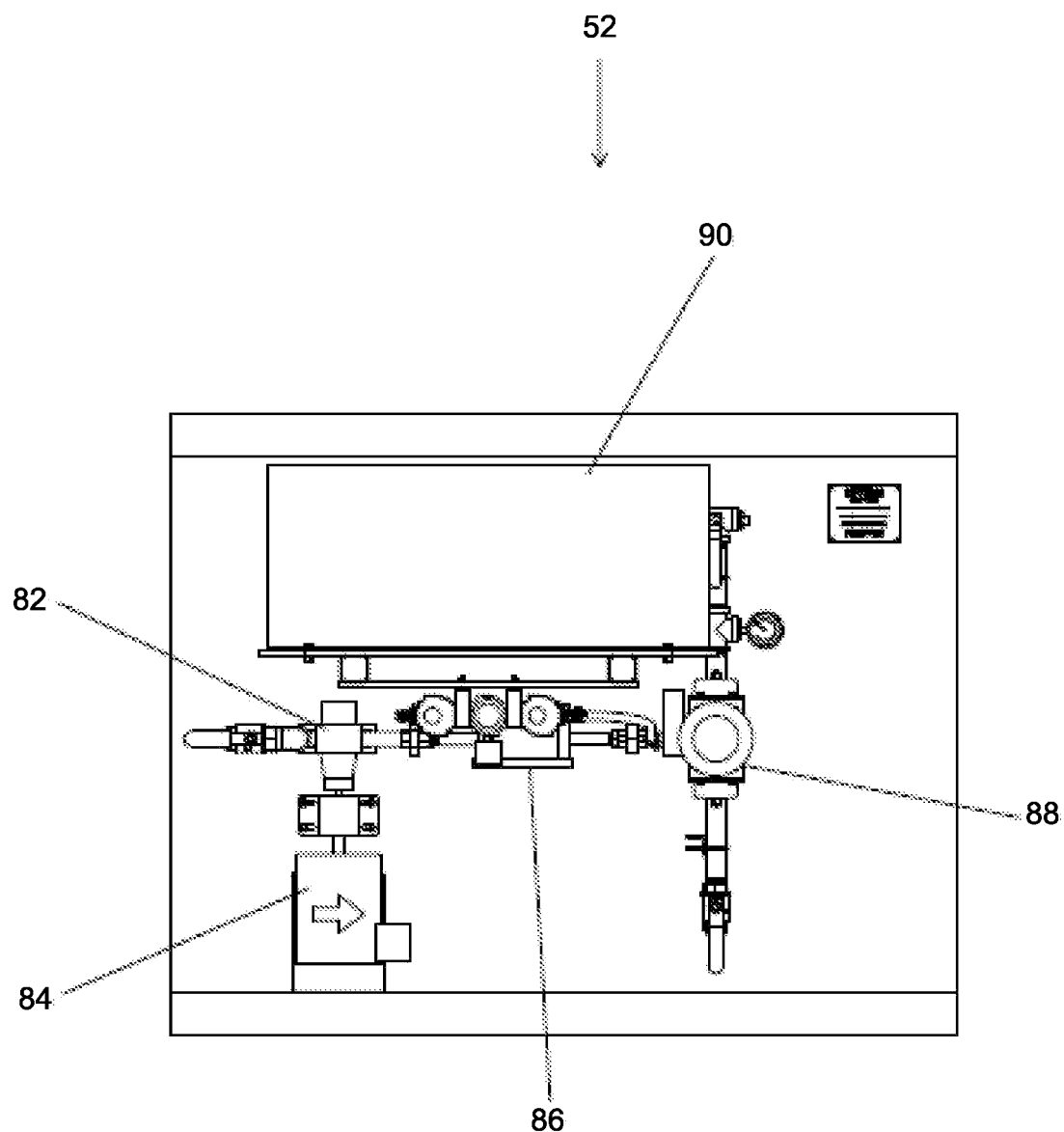
FIG. 4 is a plan view of one of the metering pump skids of FIG. 2.

Referring to FIG. 4, a metering pump skid 52 includes a metering pump 82, a variable speed motor 84, which drives the metering pump 82, and a flow meter 86. Also included are a 3-way divert valve 88, and an electrical control panel 90 (note that the panel 90 may be eliminated for each individual skid 52 and, instead, a central control panel which also houses the main controller may be used). In one embodiment, the controller takes input from the flow meter 86 and controls the rate of the variable speed drive motor 84 to drive the metering pump 82 in order to maintain the flow rate at a desired setpoint, which is set by the operator in accordance with the formulation to be produced. Use of the metering pump 82 in conjunction with the flow meter 86 eliminates the problem due to fluctuating back pressure which can occur in static blending units and which can cause the improper proportioning of ingredients and can result in mixing an inferior and unacceptable product.

In a preferred embodiment, the controller monitors the RPM of the metering pumps 82 and monitors the flow meters 86. The controller controls the flow rates of all the metering pumps 82 for the additives and of the asphalt cement feed pump (not shown) so as to maintain a desired ratio of each additive ingredient relative to the asphalt cement. The ratio of each additive to the asphalt cement flow can be individually adjusted, as desired, to reach the desired final formulation. The flow from each metering pump skid 52A-D may be diverted in order to check the calibration of the metering pump 82 as well as the calibration of the flow meter 86.

The storage tank 58 (See FIG. 2) is used as a feed tank for one of the additives injected into the asphalt cement via one of the metering pump skids 52. There is a similar tank 58 for each of the skids 52. The tank 58 includes a float valve arrangement (not shown) to ensure a constant level of additive to better ensure adequate flow control through its respective metering pump 82.

During operation, the operator inputs the desired formulation to the controller, which sets the different metering pump skids 52A-D for the correct ratio of each ingredient relative to the flow of asphalt cement. The asphalt cement is pumped to the blending mill skid 54, where it enters at the inlet connection 64, as shown in FIG. 3. The valve 66 routes the asphalt cement to the inlet of the in-line shear mixer 36. Just upstream of the in-line shear mixer 36, the additives coming from the metering pump skids 52A-D are injected into the feed line via the injection ports 72. The in-line shear mixer 36 thoroughly blends and emulsifies the asphalt cement with the additives as the mixture flows toward and then is discharged via the outlet 74. The blended asphalt cement mixture then is routed through a static mixer 60, if one is used (See FIG. 2), before being added directly to the aggregate (and the RAP, fines, and RAS) in the rotary mixer 30 (See FIG. 1). The static mixer 60 is optional and could be eliminated if desired.

The Product Storage Silo System 40

Referring again to FIG. 1, the final desired asphalt blend exits the rotary mixer 30 and is transferred, via a drag slat conveyor 92 (See FIG. 1), to the silo farm 40, where the controller automatically selects the silo for storage of the asphaltic product. The quantity of storage silos typically ranges from one to 12. A transfer conveyor is used to connect each silo. Multiple chutes and gates are used to dispense the material into each silo. Sensors are used to sense the position of each gate and transmit that information to the central controller. A zero speed switch is attached to the tail shaft of each conveyor to confirm it is moving material. Motor current sensors alarm if the conveyor load increases beyond a predetermined setpoint.

A holding hopper (batcher) above each silo is used to collect a varied amount of material before the material can be dropped into the storage silo. The discharge gates of the batcher are controlled based on time, level, or a combination of both. A high level switch located at the top of the storage silo ensures it is not overfilled.

The central controller provides the proper output power signals to start the conveyors and position the gates determined by which storage silo the operator selects. The numerous input sensors are analyzed by the central controller. An output alarm and plant shutdown can be actuated if the correct input signals are not received.

Weight scales on each silo may be used to confirm that the desired quantity of asphaltic product has been produced and stored in the silo.

Overall Plant Operation

The facility is redundantly instrumented and controlled such that the central controller can monitor the entire operation, and can double-check critical operating parameters against set points as well as against each other. What is meant by "redundantly instrumented" is that an alternate nature parameter is sensed and monitored to verify the operating parameter. Thus, independent, or alternate-natured readings are obtained for each critical operating parameter.

For instance, as already described, preferably all bin feed conveyors have variable speed drives for the drive motors (with a variable drive speed signal set by the central controller for each drive motor based on load calibration) and RPM monitors on the tail shaft of each feed conveyor. So, the central controller compares the variable speed drive signal being sent to the drive motor with the signal from the RPM monitor on the tail shaft of the conveyor which senses the speed of the conveyor that is being driven by that variable speed drive motor. If the drive signal being sent to the drive motor is telling the motor to operate at a certain speed, and the RPM monitor on the tail shaft of the conveyor senses that the conveyor actually is operating at a different speed, then the central controller will sense the problem. The problem may be caused by a broken shaft on the drive motor or by some other breakdown in the drive system, and the central controller will send an alarm to the operator, and modify other operating parameters, accordingly. An RPM monitor also may be put on the drive motor, and the central controller may monitor that RPM and compare it to the control signal being sent to the motor and to the RPM at the tail shaft, if desired.

Other "redundant" instrumentation includes flow meters and RPM monitors to double-check the flow rates against the RPM of the variable-speed-drive, positive displacement pumps and against the signals being sent to the pumps. That is the case with the flow of liquid asphalt, for example. If only the RPM of the pump were sensed, the controller would not know if the liquid asphalt storage tank had run out of liquid asphalt. However, by using a flow meter and sensing the flow rate of the liquid asphalt in addition to sensing the speed of the positive displacement pump and checking those data against each other and against the signal being sent to the motor and against the setpoint, the central controller knows when the liquid asphalt is not flowing properly and can set off an alarm and/or shut down the plant in response to the problem. Other sensors may include position switches to double-check that actuated valves have indeed moved to the desired positions (in addition to knowing that the actuator has been electrically actuated); and redundant belt scales on conveyors, such as two independent belt scales located one after the other along the conveyor belt, to ensure that product is being transferred at the desired rate by the conveyors.

This control system also permits the operator to manually switch over to a different asphalt formulation "on the fly", without having to shut down the plant.

It should be noted that, upon initial start-up of the facility, the central controller is "taught" the operating parameters, the set points for these parameters for the various asphalt formulations to be produced, the relationship between an operating parameter and the physical response of the system as that operating parameter is adjusted across its operating range. This relationship includes the time for other systems within the plant to respond to a change in the input of an operating parameter. The controller learns, for instance, the time it takes for the RAP to arrive at the screen deck 46 and the rotary mixer scale conveyor 26 for different speed settings of the RAP bin (with its feed conveyor) 12, and the time it takes for the RAP to arrive at the rotary mixer 30 for different speed settings of the rotary mixer scale conveyor 26.

The controller learns other relationships of operating parameters within the plant, such as the maximum capacity and the dwell time of the aggregate in the rotary dryer 28, the maximum capacity and the dwell time of the asphaltic product in the rotary mixer, the maximum capacity of each of the silos in the silo system 40, typical electrical power drawn, as measured by amp loading on the drive motor, for each of the electrical motors in the facility 10, and the amperage drawn as a function of RPM and/or load for variable speed drive motors. The amperage of many of the motors also is measured, and that information is sent to the central controller, which may generate an alarm signal or generate other corrective responses if the amperage drawn by any motor is outside of specified limits.

Finally, the controller is programmed with instructions on how to proceed in a number of foreseen scenarios. The actions taken by the controller may range from a simple alarm notification to the operator; to an alarm to the operator with a recommended course of action; to a planned or emergency shutdown of the plant with notification to the operator. The alarm notification also may include sending a signal such as a text message or automated phone call to a remote location. Likewise, the controller can receive instructions from the operator, after the alarm condition has been checked out or cleared, to proceed with normal operation of the facility, or to initiate a hot start-up or a cold start-up.

As an example, in one operating scenario, the facility 10 is operating at normal capacity when a sensor indicates that the RAS is no longer being fed to the rotary mixer 30. This sensor may be, for instance, an amperage sensor on the drive motor of the RAS transfer conveyor 18, which indicates a drop in amperage on that motor substantially below the normal operating amperage.

The central controller would verify that the RAS bin (with its feed auger) 16 is operating properly by checking the RPM monitor on the tail shaft of the feed auger and that the speed matches with the setpoint. The controller therefore has immediately sensed the existence of a problem, has eliminated possible reasons for the problem, and thereby has pinpointed the source of the problem.

The controller then would automatically fire the vibrator or air cannon to try to dislodge a jammed or plugged condition in the RAS container to re-establish flow. If the flow is not re-established, as sensed by the increased amperage draw on the drive motor for the RAS transfer conveyor 18, the controller then would alarm the operator with a recommendation to immediately check to see whether the RAS container 16 is empty (in this case have the personnel use the front-end loader to add more RAS to the container 16).

The controller could be programmed to automatically adjust the inputs to accommodate the loss of RAS feed, such as by increasing the feed of aggregate and of liquid asphalt, or it could be programmed to make a temporary hot stop of the plant or to shut down the plant on a programmed shutdown sequence and to await notification that the problem has been resolved.

Once the problem has been resolved, the controller gradually speeds up the feed of RAS into the mix and adjusts the flow of other materials, keeping the product within the specification.

It should also be noted that the controller can calculate the maximum amount of time that the facility 10 can operate, even at reduced flow rates, before the controller can no longer adjust the operating parameters on-the-fly to correct for the problem while maintaining the final product on spec. If the problem has not yet been resolved within that amount of time, the controller may be programmed to proceed with an automated shutdown of the facility 10, possibly maintaining certain components in operation, such as the rotary mixer 30. Once the problem has been resolved and the controller is advised accordingly either by sensors or by operator input, it may proceed with a hot or a cold start-up, as required by the amount of time the plant 10 has been shut down. During a hot start, the controller sequences the start-up of each component so that the asphaltic product produced meets the specification before it is released to the silo system 40 and so that the starting load on the plant's electrical system is not overloaded, which could cause a new shutdown even before the plant is fully back up on line. The screen deck 46 is started up before starting up the rest of the system in order to prevent electrical and/or material overload.

The plant 10 also features a number of other sensors, which are alarmed and interlocked for a properly sequenced programmed shutdown if required. These sensors may include redundant temperature sensors, with setpoints and alarms, for aggregate temperature in the rotary dryer 28, air stream temperature to the cyclone separator 50, asphaltic cement product temperature in the rotary mixer 30, and finished product storage temperature in the silo farm 40.

The pumping of liquid additives via the metering pumps 82, including the metering of the liquid asphalt, may be double-checked and calibrated manually by diverting the liquid via the divert valve 88 (See FIG. 4) to a tank in order to weigh the liquid pumped. Once the relationship between pump RPM and flow rate (as measured by the flow meter 86 and confirmed by the tank weight method) has been established, the controller can control the flow rate by taking the reading from the flow meter 86 and using this reading to set the pump RPM. If the controller senses a no-flow reading or if the flow rate reading from the flow meter 86 deviates from the expected reading based on the pump RPM, the controller alerts the operator and may shut down the plant 10, if necessary, until the alarm condition is resolved.

Finally, the controller can store the collected data, sort the data, and provide a print-out of all the relevant statistics for a given production run in order to satisfy customers' quality control departments.

While the embodiment described above shows one arrangement for operating an asphalt plant, it will be obvious to those skilled in the art that modifications could be made to the arrangement described above without departing from the scope of the present invention as claimed.

What is claimed is:

1. A method for operating an asphalt plant, comprising the steps of:
transporting aggregate on a first conveyor to a dryer;
sensing the amount of aggregate being transported on the first conveyor by using at least two spaced-apart, in-line belt scales on the first conveyor;
sending readings from said spaced-apart, in-line belt scales on the first conveyor to a central controller;
and comparing said readings from said spaced-apart, in-line belt scales on said first conveyor to each other and to an aggregate flow set point.

2. A method for operating an asphalt plant as recited in claim 1, wherein, when said readings from said belt scales on the first conveyor differ from each other by greater than a set amount or differ from the set point by greater than a set amount, the controller sends a signal to the operator.

3. A method for operating an asphalt plant as recited in claim 1, and further comprising the steps of measuring a speed of a positive displacement pump which pumps liquid asphalt to be mixed with the aggregate; and using a flow meter to measure the flow rate of liquid asphalt being pumped by said positive displacement pump.

4. A method for operating an asphalt plant as recited in claim 3, and further comprising the step of using an in-line shear mixer to mix additives into the liquid asphalt as the liquid asphalt is being pumped by the positive displacement pump.

5. A method for operating an asphalt plant as recited in claim 4, and further comprising the steps of transporting recycled material on a second conveyor to be mixed with said aggregate;
sensing the amount of recycled material being transported on the second conveyor by using at least two spaced-apart, in-line belt scales on the second conveyor;
sending readings from said spaced-apart, in-line belt scales on the second conveyor to the central controller;
and comparing said readings from said spaced-apart, in-line belt scales on the second conveyor to each other and to a recycled material set point.

6. A method for operating an asphalt plant as recited in claim 5, wherein, when the readings on both of the belt scales on the second conveyor indicate that the flow of recycled material is greater than a set amount below the recycled material set point, the controller sets off vibrators or air cannons.

7. A method for operating an asphalt plant as recited in claim 5, wherein, when the controller senses a flow rate of materials selected from the group consisting of aggregate, liquid asphalt and recycled material that varies from the respective set point which cannot be corrected automatically, the controller shuts down the plant for a brief period of time to permit correction by an operator and then sequences the start-up of motors and pumps to restart the plant for a hot start to produce asphaltic product that meets the specification without overloading the plant's electrical system.

8. A method for operating an asphalt plant as recited in claim 1, wherein said two spaced-apart, in-line belt scales provide redundant measurements to the controller.

9. A method for operating an asphalt plant as recited in claim 8, wherein, when the readings on both of the belt scales on the first conveyor indicate that the flow of material is greater than a set amount below the set point, the controller sets off at least one device selected from the group consisting of vibrator and air cannon to re-establish flow.

* * * * *